Patented Nov. 13, 1923.

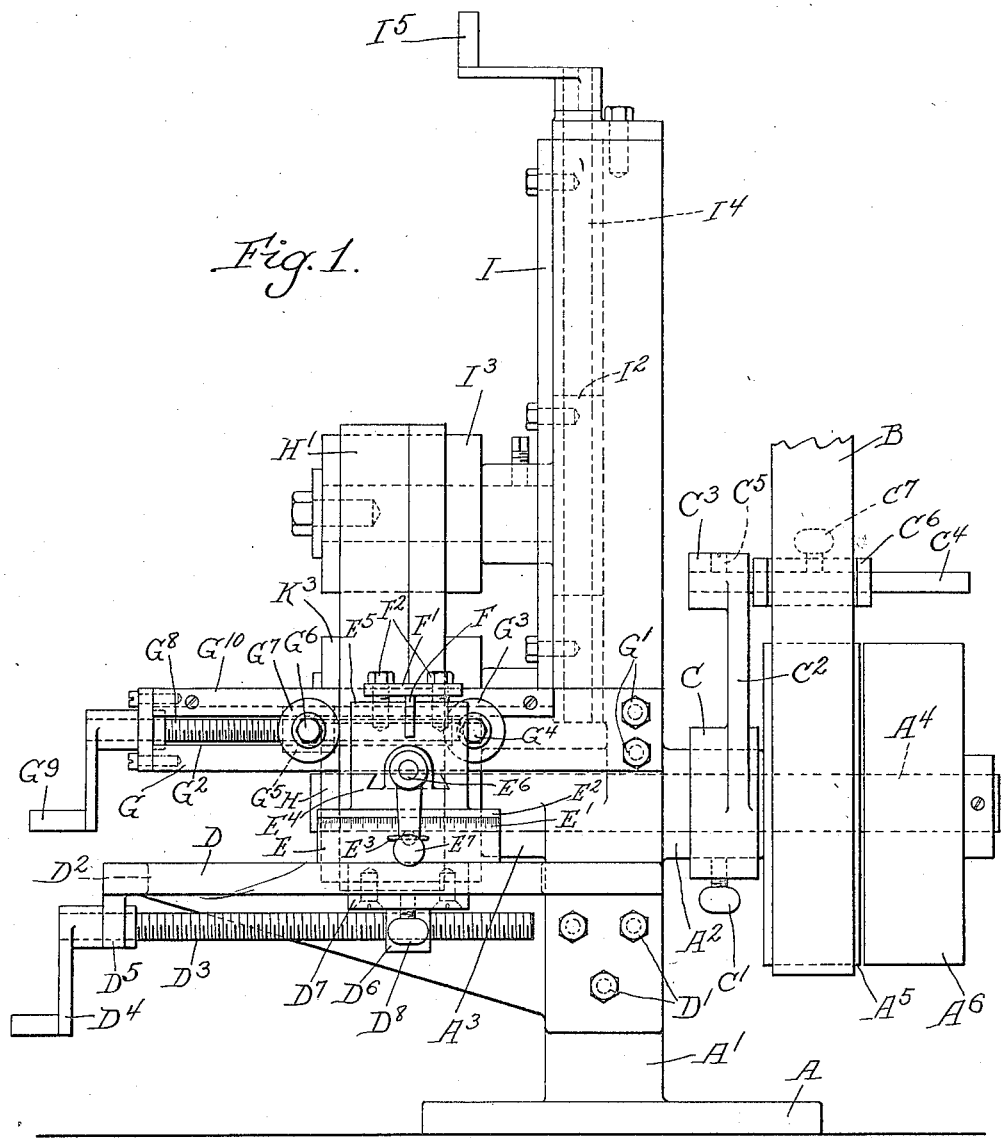

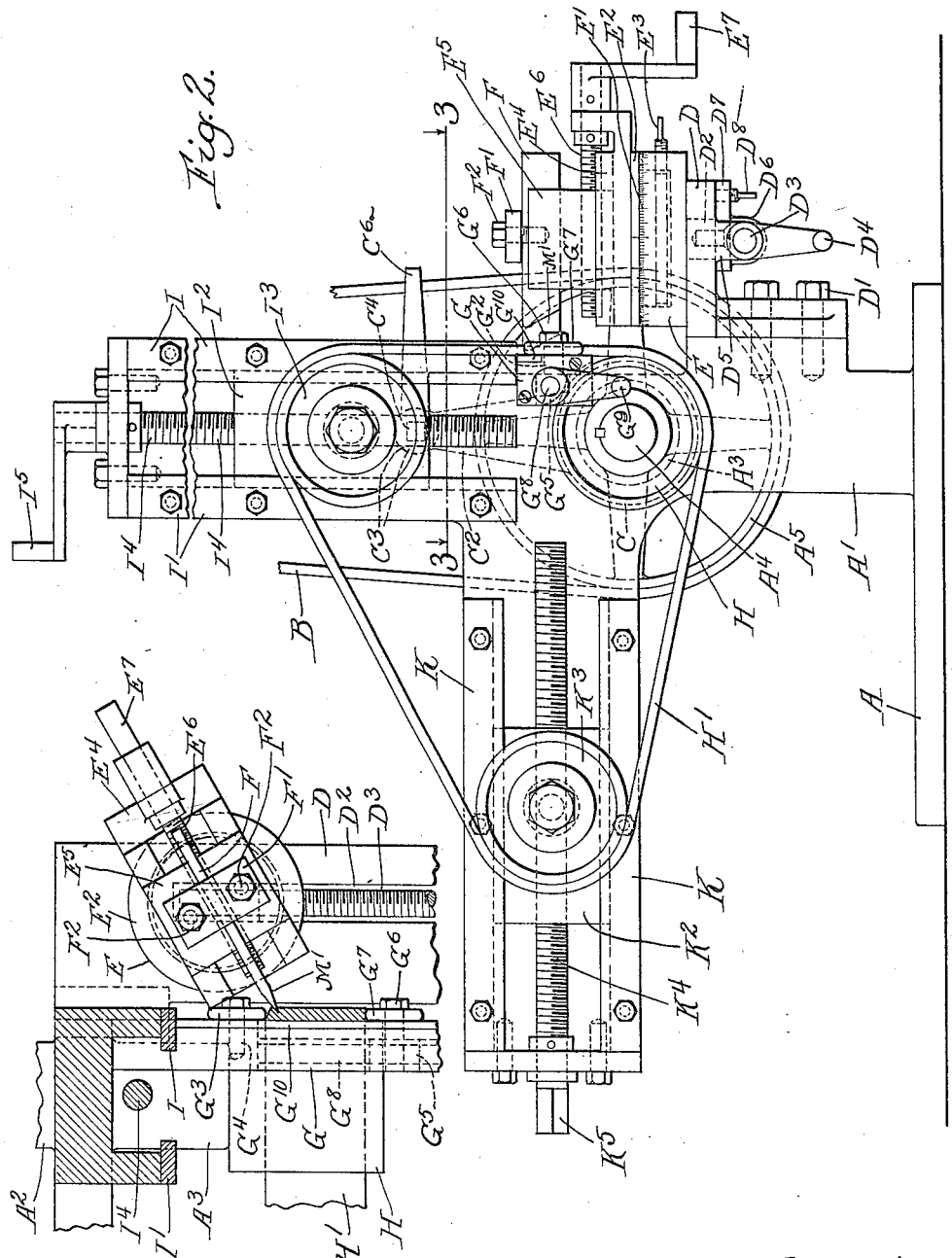

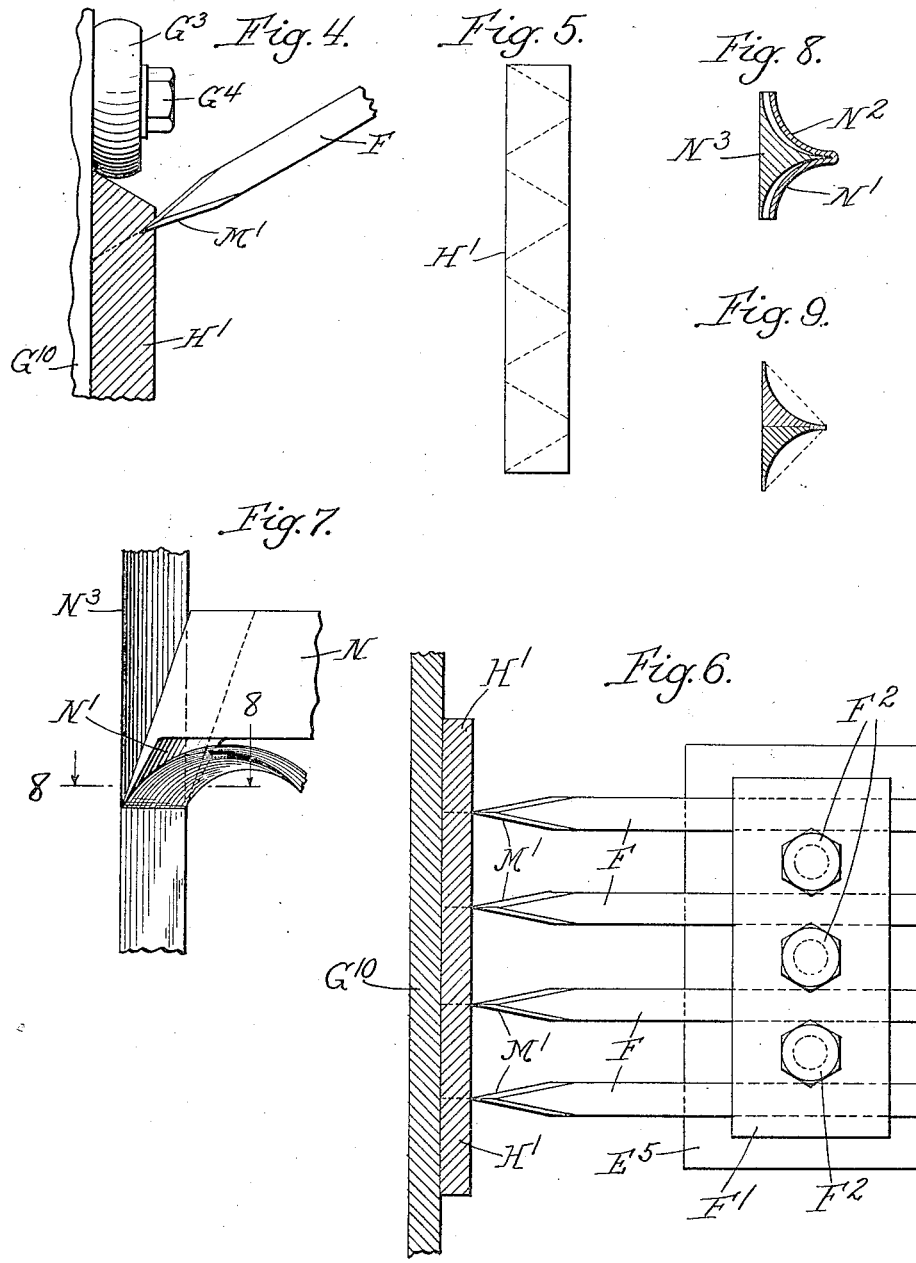

1,473,642

UNITED STATES PATENT OFFICE.

HUGO REICHEL, OF CHICAGO, ILLINOIS.

BELT CUTTER.

Application filed March 27, 1922. Serial No. 547,170.

*To all whom it may concern:*

Be it known that I, HUGO REICHEL, a citizen of the United States, residing at Chicago, in the county of Cook and State of Illinois, have invented a certain new and useful Improvement in Belt Cutters, of which the following is a specification.

My invention relates to a belt cutter, and particularly to a machine for cutting small, endless belts from broad, endless belt units. It has for one purpose to provide a machine which will cut a large number of smaller belts simultaneously from a large belt. Another object is to provide a machine which will cut small belts of V-shaped cross-section. Another object is to provide a machine for cutting fillets. I provide a machine for carrying out all of these functions, which is adjustable to practically any length of belt and adjustable to any angle of V-shaped belt, and adjustable for wear, which shall be easy to operate and quick to set and adjust. Other objects will appear from time to time in the course of the specification.

I illustrate my invention more or less diagrammatically in the accompanying drawings, wherein—

Fig. 1 is a front elevation;

Fig. 2 is an end elevation;

Fig. 3 is a section on the line 3—3 of Fig. 2;

Fig. 4 is a detail showing the cutting of a V-shaped belt;

Fig. 5 is a diagram illustrating the use of material in the cutting of a V-shaped belt;

Fig. 6 is a view of a variant cutting tool, used for simultaneously severing a large number of belts;

Fig. 7 is a fillet-cutting tool;

Fig. 8 is a section on the line 8—8 of Fig. 7; and

Fig. 9 is a cross-section of the fillet cut by the tool of Fig. 8.

Like parts are indicated by like characters throughout the drawings and specification.

A is any suitable base having an upwardly projecting frame support $A^1$, having the outwardly projecting bearing stubs $A^2$ $A^3$ in which rotates the drive shaft $A^4$. Secured to the shaft $A^4$ are the pulleys $A^5$ $A^6$, one of which is keyed to the shaft and the other rotatable thereon, and the belt B may be shifted from one to the other by any suitable means, in order to actuate the machine or bring it to rest. The shifter, as shown, comprises a collar C, rotatable on the stub $A^2$ and secured in place by the set screw $C^1$. Projecting from it is the arm $C^2$ having the stub $C^3$, on which is mounted the square bar $C^4$ which is secured in place by the screw $C^5$. The belt-engaging element $C^6$ is movable along the bar $C^5$ and may be fixed in position by the set screw $C^7$. The shifting mechanism may thus be rotated about the shaft $A^4$, depending on the location of the driving pulley of the belt B.

Projecting in the opposite direction from the frame $A^1$ is the supporting bracket D bolted thereto as at $D^1$. This bracket is slotted, as at $D^2$, and is provided with a worm $D^3$ having a crank $D^4$ rotatable in a bearing $D^5$, the outer end of the worm engaging a perforated screw-threaded lug $D^6$ which depends from a sliding block $D^7$ adapted to slide backwards and forwards in the slot $D^2$, and which may be set by the set screw $D^8$. Mounted on the block $D^7$ is a species of turret E, which is circular in horizontal cross-section and is calibrated, as at $E^1$, to permit adjustment of the tool carried thereby. Mounted on this turret is the rotatable element or plate $E^2$, which may be set in position by the set screw $E^3$, in relation to the calibration. It carries a track element $E^4$ and a sliding block $E^5$ adapted to be moved along the track. This block is perforated and screw-threaded to admit the screw $E^6$, which may be rotated by the crank $E^7$.

Mounted in the block $E^5$ is any suitable cutting tool F, which is adjustable therein and may be secured in place, as, for example, by the clamping element $F^1$ and the bolts $F^2$.

Above and to one side of the bracket D is the bracket G, bolted to the frame as at $G^1$ and slotted as at $G^2$. Above the slot $G^2$ lies a wooden or fibrous strip $G^{10}$, the purpose of which will appear later. Adjacent the inner end of the slot is the fixed roller $G^3$, rotatable on the bolt $G^4$. Movable along the slot is the carrying block $G^5$, carrying a similar bolt $G^6$ and roller $G^7$. This carrying block is engaged by the screw $G^8$, which has associated with it the manual crank $G^9$.

Mounted on the shaft $A^4$, and lying adjacent the turret mechanism, is the pulley H, about which passes the belt $H^1$. The upper portion of the frame $A^1$ is slotted and provided with track elements I $I^1$, along which moves a sliding block I² on which is mounted the pulley I³. The sliding block is controlled by the vertical screw I⁴, having a manual crank I⁵. Projecting outwardly from the frame A¹ are similar track elements K K¹, having the sliding block K² with a pulley K³ mounted thereon, said sliding block being controlled by the screw K⁴ having the square end K⁵, to which the crank may be secured.

The tools used with this device may be widely varied. In Figs. 3 and 4 I have illustrated a single tool M, having a double beveled cutting edge M¹. This tool is used for cutting inclined-sided or V-shaped belts. In Fig. 6 I illustrate a gang of similar cutting elements which are used to cut straight-sided belts. In Figs. 7 and 8 I illustrate a fillet-cutting element N, which comprises the two curved cutting surfaces N¹ N², which scoop out a fillet the cross-section of which is shown at N³.

While I have illustrated a working device, it will be understood that many changes might be made in the number, size, shape and relation of parts without departing from the spirit of my invention. I wish, therefore, that my drawings be regarded as to a large extent diagrammatic.

The use and operation of my invention are as follows:

I illustrate a positively driven belt-cutting device in which power from any suitable source is transmitted to the endless belt from which the smaller belts are to be cut. This belt is driven by a fixed pulley, it being extended about the fixed pulley and two adjustable pulleys. The sliding blocks which carry the movable pulleys may be moved in or out to compensate for any length of belt, or, if desired, one of them may be cut out altogether. The knife-carrying element is, in the first place, adjustable along the slot D², to compensate for any width of belt. It is, in the second place, adjustable as to angle, by rotation of the plate or turret. And in the third place it is adjustable axially along the length of the knife, to move the knife to and from the work. Finally, there is an additional adjustment shown at F¹ F², for example, in Fig. 2, to compensate for wear of the knife. The knife may be set at any angle, the turret and turret plate being calibrated.

The belt to be worked on passes across the front of the bracket G, and being stretched between the pulleys H and I³ shows a flat surface to the knife. The wood or fiber element G¹⁰ lies opposite the cutting point of the knife, so that the knife may be thrust all the way through the belt and into the wood, to give an absolutely clear, clean edge to the cut. The belt, as it passes across the surface of the bracket G, is contained between the rollers G³ and G⁵, G³ being fixed and G⁵ being adjustable to hold the inner edge of the belt against the roller G³. This centers the belt in relation to the knife and permits of accurate adjustment of the knife to cut accurately to specification. The whole knife assembly, of course, may be moved back and forth to compensate for the width of the belt, and this adjustment, together with the adjustment for angle, permits any width or angle of belt to be cut.

In cutting V-shaped belts, the inner edge of the broad belt blank is first sheared off to show the angle illustrated in Fig. 4; then the cut shown in Fig. 4 is made, and the belt removed and the finished V-shaped belt withdrawn from the machine. The belt blank is then reversed and moved into position opposite the knife, which cuts another V. The alternate cutting and reversing results in cuts across the big belt, such as are diagrammatically shown in Fig. 5, and thus there is no wastage except the two small triangles at the ends of the belt; otherwise the entire belt body is used. During the cutting operation the knife is advanced by rotation of the handle E⁷ and the cutting edge penetrates the belt, which is moving upwardly at that point. The extreme tip of the sharp edge of the knife goes entirely through the belt and into the fiber or wood.

If square-sided small belts are desired a large number may be cut at once by mounting a plurality of knives in tandem and moving the entire gang forward against the belt blank, as shown in Fig. 6.

The machine may also be used to cut fillets, the fillet-cutting tool being shown in Figs. 7 and 8. It scoops from the blank the fillet shown in cross-section at N³, in Fig. 8, and this then may be bisected to form two fillets, as diagrammatically shown in Fig. 9. The fillet belt may then be severed and used in the desired lengths for fitting in corners or for other purposes for which fillets are used.

While the present invention has been described primarily for cutting a large number of small belts from a large belt, it will be obvious that it may also be used to trim single belts down, to substitute inclined edges for straight edges, or straight edges for inclined edges, and to trim or cut through thick composite belts.

It will be obvious that the present invention provides a machine which has enormous flexiblity in use; which may be used with belts of any length; which may cut belts of a variety of cross-section, and which is easy and economical to use.

Furthermore, it may be used with belts of leather, or fiber, or of any other readily cut material and with the tools used for cutting rubber, it may be used to cut rubber belts or strips, in fact this machine is capable of a multitudinous number of applications which are not herein set forth in detail.

I claim:—

1. A machine for longitudinally cutting belts comprising a belt driving pulley and a belt supporting pulley and means for varying the distance therebetween comprising a track member, a sliding pulley support mounted therein, and means for moving said pulley support along said track element, and a cutting element adapted to operate on said belt intermediate said pulleys.

2. A machine for longitudinally cutting belts comprising a belt driving pulley and a belt supporting pulley and means for varying the distance therebetween comprising a track member, a sliding pulley support mounted therein, and means for moving said pulley support along said track element, comprising a screw in screw-threaded arrangement therewith and means for rotating it, and a cutting element adapted to operate on said belt intermediate said pulleys.

3. A machine for longitudinally cutting belts comprising a fixed belt driving pulley and a plurality of adjusting belt supporting pulleys, and means for separately adjusting each of them to vary the distance between it and the fixed pulley, and a cutting element adapted to operate on said belt intermediate said pulleys.

4. A machine for longitudinally cutting belts comprising a fixed belt driving pulley and a plurality of adjusting belt supporting pulleys, and means for separately adjusting each of them to vary the distance between it and the fixed pulley, comprising sliding carriages on which said pulleys are mounted, and tracks along which said carriages are adapted to be moved, and positive means for controlling the motion of said carriages therealong, and a cutting element adapted to operate on said belt intermediate said pulleys.

5. In a machine for longitudinally cutting belts, a belt rotating means, and driving means therefor, tension elements adapted to maintain a suitable tension in said belt, a cutting base over which said belt travels, a cutting element in line with said base, and means for advancing it into cutting contact with said belt.

6. In a machine for longitudinally cutting belts, a belt rotating means, and driving means therefor, adjustable tension elements adapted to maintain a suitable tension in said belt, a cutting base over which said belt travels, a cutting element in line with said base, and means for advancing it into cutting contact with said belt.

7. In a machine for longitudinally cutting belts, a belt driving pulley, and a plurality of adjustable tension maintaining pulleys about which the belt is adapted to pass, a cutting base intermediate said pulleys, a cutting element in opposition to said base, and means for advancing it into cutting contact with said belt.

8. In a machine for longitudinally cutting belts, a belt driving pulley, a supporting pulley, and means for adjusting the distance between the axes thereof, a cutting element located intermediate said pulleys, and means for advancing it into cutting contact with said belt at a point intermediate said pulleys.

9. In a machine for longitudinally cutting belts, a belt driving element, a belt supporting element and means for varying the distance therebetween, a cutting base intermediate said elements, a cutting element in opposition thereto and means for advancing said cutting element into the cutting contact with the belt, and against said base.

10. A machine for longitudinally cutting belts, comprising a belt driving element and a belt supporting element and means for varying the distance between said driving and supporting elements, and a cutting element adapted to operate on said belt therebetween, and means for adjusting the cutting element laterally across the face of the belt.

11. In a machine for longitudinally cutting belts, a belt rotating means, and driving means therefor, tension elements adapted to maintain a suitable tension in said belt, a cutting base over which said belt travels, a cutting element in line with said base, means for advancing it into cutting contact with said belt, and means for adjusting the cutting element laterally across the face of the belt.

12. A machine for longitudinally cutting belts, comprising a belt driving element and a belt supporting element and means for varying the distance between said driving and supporting elements, a cutting element adapted to operate on said belt therebetween, and means for adjusting the angle of said cutting element.

13. In a machine for longitudinally cutting belts, a belt rotating means, and driving means therefor, tension elements adapted to maintain a suitable tension in said belt, a cutting base over which said belt travels, a cutting element in line with said base, and means for advancing it into cutting contact with said belt, and means for adjusting the angle of said cutting element.

14. In a machine for longitudinally cutting belts, comprising a belt driving element, a belt supporting element and means for varying the distance between the driving and supporting elements, a cutting element, means for adjusting it laterally across the face of the belt, and means for adjusting the angle of said cutting element.

15. In a machine for longitudinally cutting belts, a belt driving element, a belt supporting element and means for varying the distance therebetween, a cutting base intermediate said elements, a cutting element in opposition thereto and means for advancing said cutting element into cutting contact with the belt, and against said base, said cutting base comprising in part a relatively soft, non-metallic member.

16. In a machine for longitudinally cutting belts, a belt driving element, a belt supporting element and means for varying the distance therebetween, a cutting base intermediate said elements, a cutting element in opposition thereto and means for advancing said cutting element into cutting contact with the belt, and against said base, said cutting base comprising in part a wooden block.

17. In a machine for longitudinally cutting belts, a belt rotating means, and driving means therefor, tension elements adapted to maintain a suitable tension in said belt, a cutting base over which said belt travels, a cutting element in line with said base, and means for advancing it into cutting contact with said belt and a plurality of belt guiding elements mounted on said base.

18. In a machine for longitudinally cutting belts, a belt rotating means, and driving means therefor, tension elements adapted to maintain a suitable tension in said belt, a cutting base over which said belt travels, a cutting element in line with said base, means for advancing it into cutting contact with said belt and a plurality of belt guiding elements mounted on said base, one of said elements being fixed, and the other being longitudinally adjustable across said base.

19. In a machine for longitudinally cutting belts, a belt rotating means and driving means therefor, means for maintaining a suitable tension in said belt, a cutting base over which said belt travels, a cutting element in line with said base, comprising a plurality of belt engaging knives, and means for advancing said knives into cutting contact with said belt.

20. In a machine for longitudinally cutting belts comprising belt rotating means and motive means therefor, a cutting element, an opposed cutting base, and a plurality of belt guiding elements mounted on said base, comprising a fixed element adapted to engage one edge of the belt and an adjustable element adapted to engage the opposite edge of the belt.

Signed at Chicago, county of Cook and State of Illinois, this 24th day of March, 1922.

HUGO REICHEL.